United States Patent
Klein et al.

(10) Patent No.: US 6,627,341 B2
(45) Date of Patent: Sep. 30, 2003

(54) DEVICE FOR COMPENSATING FOR FLUCTUATIONS IN FUEL CONCENTRATION IN FUEL CELL SYSTEMS

(75) Inventors: Christian Klein, Kirchheim u. Teck (DE); Martin Schussler, Ulm (DE)

(73) Assignee: Ballard Power Systems AG, Kirchheim-Nabern (DE)

(*) Notice: Subject to any disclaimer, the term of this patent is extended or adjusted under 35 U.S.C. 154(b) by 106 days.

(21) Appl. No.: 09/837,421

(22) Filed: Apr. 19, 2001

(65) Prior Publication Data

US 2002/0022166 A1 Feb. 21, 2002

(30) Foreign Application Priority Data

Apr. 20, 2000 (DE) .......................... 100 19 772

(51) Int. Cl.[7] .................... H01M 8/04; H01M 8/18; H01M 8/12
(52) U.S. Cl. ..................... 429/22; 429/19; 429/17
(58) Field of Search ............... 429/12, 13, 17, 429/19, 22, 23

(56) References Cited

U.S. PATENT DOCUMENTS

| | | | | |
|---|---|---|---|---|
| 4,865,624 A | * | 9/1989 | Okada | 48/61 |
| 5,030,440 A | * | 7/1991 | Lywood et al. | 423/655 |
| 5,256,172 A | * | 10/1993 | Keefer | 423/230 |
| 5,271,916 A | * | 12/1993 | Vanderborgh et al. | 423/246 |
| 5,302,470 A | * | 4/1994 | Okada et al. | 429/17 |
| 5,604,047 A | * | 2/1997 | Bellows et al. | 429/19 |
| 5,925,476 A | * | 7/1999 | Kawatsu | 429/24 |
| 6,168,772 B1 | * | 1/2001 | Watanabe | 423/247 |
| 6,190,430 B1 | * | 2/2001 | Fukuoka et al. | 48/198.3 |
| 6,245,214 B1 | * | 6/2001 | Rehg et al. | 205/764 |
| 6,277,329 B1 | * | 8/2001 | Evans | 422/80 |
| 6,350,423 B1 | * | 2/2002 | Aoyama | 423/247 |

FOREIGN PATENT DOCUMENTS

GB 2 268 322 A 6/1993

* cited by examiner

Primary Examiner—Randy Gulakowski
Assistant Examiner—Donald V. Scaltrito
(74) Attorney, Agent, or Firm—Seed IP Law Group PLLC

(57) ABSTRACT

A device for compensating for fluctuations in the concentration of a gaseous constituent in the fuel gas stream of a dynamically operated fuel cell system, has a buffer component arranged in the fuel gas stream, provided downstream of a component of the fuel cell system which is to be protected. The buffer component takes up the gaseous constituent from the fuel gas stream in the event of the partial pressure rising and releases the gaseous constituent back into the fuel gas stream in the event of the partial pressure dropping. According to the invention, the buffer component contains a material for the adsorption or absorption of the gaseous constituent that has a take-up capacity which is dependent on the partial pressure.

16 Claims, 1 Drawing Sheet

DEVICE FOR COMPENSATING FOR FLUCTUATIONS IN FUEL CONCENTRATION IN FUEL CELL SYSTEMS

CROSS-REFERENCE TO RELATED APPLICATIONS

This application is related to U.S. patent application Ser. No. 09/837,748.

BACKGROUND AND SUMMARY OF THE INVENTION

This application claims the priority of German patent document 100 19 772, filed Apr. 20, 2000, the disclosure of which is expressly incorporated by reference herein.

The invention relates to a device for compensating for fluctuations in the concentration of a gaseous constituent in the fuel gas stream of a dynamically operated fuel cell system.

In the dynamic mode, during a hot start or in the event of malfunctions, concentration fluctuations in the fuel gas stream occur in fuel cell systems both upstream and downstream of the anode of the fuel cell. In the case of excessive carbon monoxide concentrations, these fluctuations lead to poisoning of precious metal catalysts in the fuel cell or, in a gas cleaning stage, to selective catalytic oxidation of the carbon monoxide. In the event of fluctuations in the steam concentration, the equilibrium in the water gas shift reaction may be displaced or condensation problems may occur.

Considerable deviations in the hydrogen concentration in the fuel cell exhaust gas ultimately lead to temperature fluctuations in a downstream catalytic burner and possibly in the reactors heated using waste heat from the burner. Fluctuations in concentration of this type are therefore undesirable, since they restrict the system dynamics or increase the control outlay. Moreover, they may destroy components in the fuel cell system or necessitate additional components.

British patent document GB 2 268 322 A discloses a fuel cell system having a reforming reactor and a fuel cell, with a hydrogen store arranged between them. The hydrogen store contains a proton-conducting membrane which on one side is exposed to the fuel gas stream of the fuel cell system and on the opposite side delimits a space which is filled with a hydrogen storage alloy. Application of a voltage to the proton-conducting membrane, causes hydrogen to be pumped through the membrane as a function of the partial pressures prevailing on the two sides. The desired pressure difference can be preset by selecting the voltage applied. Therefore, depending on the partial pressure in the fuel gas stream, hydrogen is taken out of the fuel gas stream into the storage alloy or out of the storage alloy into the fuel gas stream.

It is an object of the invention to provide a device which easily and reliably compensates for fluctuations in concentration in the fuel gas stream of fuel cell systems.

This and other objects and advantages are achieved by the apparatus according to the invention, in which a buffer component containing a material for adsorption or absorption of the gaseous constituent (with a take-up capacity which is dependent on the partial pressure) is arranged directly in the fuel gas stream, upstream of a component which is to be protected. In this way, it is easy to reduce the impact of (or at least smooth fluctuations in) concentration in the fuel gas stream of the fuel cell system. If the concentration falls below a preset level, the buffer component accordingly acts as a source, while if the concentration exceeds a preset level the buffer component acts to reduce the concentration. A further advantage of the device is that it can be operated passively, i.e., without additional control means and the associated actuators.

In an advantageous embodiment, it is also possible for the buffer component to have a plurality of partial components which are optimized with regard to individual gas constituents which are to be stored. It is therefore not necessary to provide a separate buffer component for each gaseous constituent, which leads to advantages with regard to the space required, the weight and the costs.

Other objects, advantages and novel features of the present invention will become apparent from the following detailed description of the invention when considered in conjunction with the accompanying drawings.

DETAILED DESCRIPTION OF THE DRAWINGS

Figure 1:
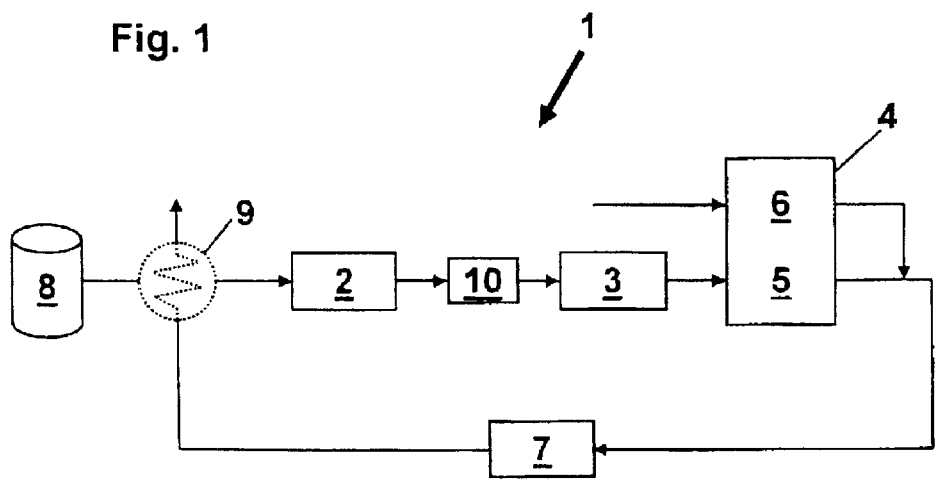
FIG. 1 shows a simplified block diagram illustrating a fuel cell system.

The fuel cell system shown in FIG. 1, denoted overall by reference numeral 1, has a gas generation unit 2, a gas cleaning unit 3, a fuel cell 4 with an anode space 5 and a cathode space 6 and an exhaust-gas treatment unit 7. A hydrogen-rich gas is generated in the gas generation unit from a fuel by means of partial oxidation and/or steam reforming. This hydrogen-rich gas usually also contains carbon monoxide, which has a damaging effect on the catalysts which are present in the anode space 5 of the fuel cell 4. For this reason, a gas cleaning unit 3 is provided between the gas generation unit 2 and the anode space 5 of the fuel cell 4. This gas cleaning unit is preferably a device for the selective catalytic oxidation of the carbon monoxide with the addition of oxygen. However, it is also possible to use other suitable gas cleaning units 3, for example a membrane cleaning unit.

After it has flowed through the fuel cell 4, the anode exhaust gas is mixed with the outgoing air from the cathode space 6 and is fed to the exhaust-gas treatment unit 7, where all the combustible constituents of the fuel cell exhaust gases are converted as completely as possible at a suitable catalyst, preferably a precious metal catalyst. As an alternative to the cathode exhaust gas, it is also possible for another oxygen-containing gas to be mixed with the anode exhaust gas upstream of the exhaust-gas treatment unit 7.

The fuel is guided out of a fuel tank 8 into the gas generation unit 2. Liquid fuels are preferably carried in the fuel tank 8; however, it is also possible to use gaseous fuels, in which case the fuel tank 8 is designed as a pressurized-gas or liquefied-gas store. When using a liquid fuel, it is customary also to provide an evaporator unit 9 which converts the liquid fuel into the gaseous phase before it enters the gas generation unit 2. In the exemplary embodiment shown, the evaporator unit 9 is heated by the hot exhaust gases from the exhaust-gas treatment unit 7. Alternatively, however, it is also possible for the evaporator to be heated by another heat transfer medium. It is also possible for the exhaust-gas treatment unit 7 to be partially or completely integrated in the evaporator unit 9.

Numerous fuel cell systems of this type are known from the prior art, for which reason such systems have not been described in detail above. The scope of protection is not to be restricted by the nature and structure of a fuel cell system of this type.

According to the invention, a buffer component 10 is arranged upstream of the gas cleaning stage 3, directly in the fuel gas stream. The fuel gas stream flows continuously through this buffer component 10, which contains a material for the adsorption or absorption of a gaseous constituent with a take-up capacity which is dependent on the partial pressure. In the exemplary embodiment illustrated, the buffer component 10 is used to compensate for fluctuations in the carbon monoxide concentration in the fuel gas stream. (When the fuel cell system is operating dynamically, in the event of load changes excessive concentrations of carbon monoxide may briefly occur in the fuel gas stream, which could lead to poisoning of the precious metal catalysts in the gas cleaning stage 3.)

Figure 2:
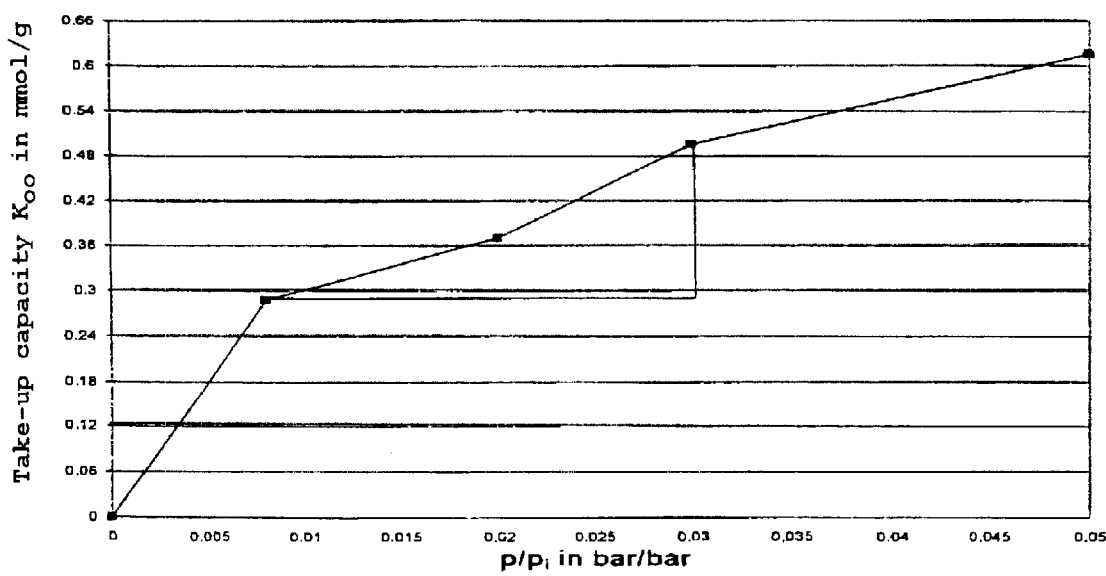
FIG. 2 shows an adsorption isotherm for carbon monoxide on CuY, measured at a temperature of 30° C., a volumetric flow rate of 0.2 l/min, an adsorber mass of 22.7 g of CuY and a level of 0.8–5% CO in the test gas.

The function of the component 10 is explained below with reference to FIG. 2, which shows the take-up capacity for carbon monoxide in an adsorption material—in this case CuY or CuZSM-5—as a function of the partial pressure of the carbon monoxide in the fuel gas stream. It can be seen from this figure that the take-up capacity rises as the partial pressure increases. The triangle which has been drawn in FIG. 2 indicates, by way of example, that the take-up capacity for carbon monoxide in the exemplary embodiment shown increases by around 75% when the carbon monoxide partial pressure changes by a factor of 4.

When the fuel cell system 1 is in operation, this means that the buffer component 10, after start-up, takes up a quantity of carbon monoxide which corresponds to the usual carbon monoxide partial pressure. Then, at a constant CO partial pressure, the loading of the buffer component 10 would likewise remain constant so that a substantially constant quantity of carbon monoxide has to be removed in the downstream gas cleaning stage 3. If the carbon monoxide content in the fuel gas stream then rises briefly on account of a load change, the CO partial pressure rises and therefore so does the take-up capacity of the buffer component 10. As a result, not all the additional quantity of carbon monoxide is passed through the buffer component 10 to the gas cleaning stage 3; rather at least some of this additional carbon monoxide is accumulated in the buffer component 10 as a result of the increased take-up capacity of the adsorption material. As a result, the additional load on the gas cleaning stage 3 is reduced.

Once the carbon monoxide content in the fuel gas stream has returned to normal after the load change, the take-up capacity of the buffer component 10 falls in accordance with the lower CO partial pressure, so that some of the accumulated carbon monoxide is released again to the fuel gas stream. Overall, therefore, the quantity of carbon monoxide which is to be removed by the gas cleaning stage 3 remains constant. However, the fluctuation in CO concentration is of reduced impact or is at least smoothed by the buffer component 10. In a corresponding way, the buffer component 10 also compensates for a brief reduction in the carbon monoxide content; in this case, first of all some of the carbon monoxide which has usually accumulated in the buffer component 10 is released to the fuel gas stream and subsequently, after the carbon monoxide content has returned to normal, this carbon monoxide is taken up again.

In an advantageous embodiment, the buffer component 10 contains an adsorber with a large surface area and Cu-containing support material, e.g. a zeolite. Other suitable materials are $Al_2O_3$ or activated carbon. These materials are particularly advantageously suitable for the adsorption of CO, but may also be used for the adsorption of methanol or water.

The device according to the invention is particularly beneficial if, in a component which is to be protected from carbon monoxide, the catalytic material of this component is on a metallic or ceramic support structure (monoliths, metal sheets), since the high heat absorption capacity of these structures makes it difficult for the catalyst to be ignited in CO-containing gas.

In addition, or as an alternative, to the exemplary embodiment shown, it is also possible to provide a corresponding buffer component 10 between the gas cleaning unit 3 and the fuel cell 4, in order to protect the precious metal catalyst in the anode space 5 of the fuel cell 4 from poisoning by carbon monoxide.

In addition to being used for carbon monoxide, however, the solution according to the invention may also be employed for other gaseous constituents in the fuel gas stream of the fuel cell system. A first example of this is the buffering of steam which is contained in the fuel gas stream. In this case, the buffer component 10 contains a material which has been optimized for this application and is suitable for the adsorption or absorption of steam, for example activated carbon, aluminum oxide/alumina, silica gel or a zeolite material. Fluctuations in the steam concentration may in particular result in displacement of the equilibrium of the water gas shift reaction in the reforming reactor 2, or may cause condensation problems. Therefore, in this case the buffer component 10 is arranged immediately upstream or downstream of the reforming reactor 2 or of a shift reactor which may be present.

A second example is the buffering of hydrogen contained in the fuel gas stream. In this case, the buffer component 10 contains a material which has been optimized for this application and is suitable for the adsorption or absorption of hydrogen, for example an alloy of composition AB, $AB_2$, $A_2B$ or $AB_5$, where A is one of the elements magnesium, calcium, titanium, zirconium, vanadium or lanthanum and B is one of the elements manganese, iron, cobalt, nickel or copper. Considerable fluctuations in the hydrogen concentration downstream of the fuel cell 4 may lead to temperature fluctuations in the catalytic exhaust-gas treatment unit 7 or possibly in the components which are heated by the waste heat from the exhaust-gas treatment unit 7, for example the evaporator 9. Therefore, in this case the buffer component 10 is preferably arranged downstream of the fuel cell 4.

Naturally, the individual components of the fuel cell system 1 may also be of multistage design, in which case the buffer component 10 may then accordingly be arranged upstream or downstream of one or more of the stages.

If necessary, it is also possible for the buffer component 10 to have a plurality of partial components which are optimized with a view to individual gaseous constituents which are to be stored. It is therefore not necessary to provide a separate buffer component 10 for each gaseous constituent, which leads to advantages with regard to the amount of space taken up, the weight and the costs.

The device according to the invention has the advantage that there is no need for complex arrangements. Moreover, the device can be of passive design, i.e. without additional control means and the associated actuators.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A device for compensating for fluctuations in concentration of a gaseous constituent in a fuel gas stream of a dynamically operated fuel cell system, comprising:

a buffer component arranged directly in the fuel gas stream upstream of a component of the fuel cell system which is to be protected, which buffer component takes up the gaseous constituent from the fuel gas stream in the case of an increase in partial pressure thereof, and releases the gaseous constituent back into the fuel gas stream in the case of a decrease in partial pressure thereof;

wherein the buffer component contains a material for the adsorption or absorption of the gaseous constituent which has a take-up capacity for said gaseous constituent which is dependent on said partial pressure.

2. The device according to claim 1, wherein:

the gaseous constituent which is to be buffered is carbon monoxide; and the buffer component is arranged upstream of a gas-cleaning stage for selective catalytic oxidation of the carbon monoxide or upstream of a fuel cell in the fuel gas stream.

3. The device according to claim 1, wherein the buffer component contains CuY or CuZSM-5.

4. The device according to claim 1, wherein:

the gaseous constituent which is to be buffered is steam; and the buffer component is arranged immediately upstream or downstream of a reforming reactor or a shift stage in the fuel gas stream.

5. The device according to claim 4, wherein the buffer component contains activated carbon, aluminum oxide/alumina, silica gel or a zeolite material.

6. The device according to claim 1, wherein:

the gaseous constituent to be buffered is hydrogen; and buffer component is arranged downstream of a fuel cell.

7. The device according to claim 6, wherein the buffer component contains an alloy of the composition AB, $AB_2$, $A_2B$ or $AB_5$, where A is one of the elements magnesium, calcium, titanium, zirconium, vanadium and lanthanum, and B is one of the elements manganese, iron, cobalt, nickel and copper.

8. The device according to claim 1, wherein the buffer component has a plurality of partial components each of which is adapted to store an individual gaseous constituent that is contained in said gas stream.

9. A method of compensating for fluctuations in concentration of a gaseous component is a fuel gas stream of a dynamically operated fuel cell, said method comprising:

providing a buffer component directly in the fuel gas stream, upstream of the fuel cell, which buffer component contains a material having a capacity to store temporarily quantities of said gaseous constituent, said capacity being dependent on concentration of said gaseous component in said gas stream;

continuously passing the fuel gas stream into contact with said buffer component, whereby said buffer component takes up the gaseous component in response to an increase in said concentration, and releases the gaseous constituent back into the fuel gas stream in response to a decrease of said concentration.

10. The device according to claim 9, wherein:

the gaseous constituent which is to be buffered is carbon monoxide; and the buffer component is arranged upstream of a gas-cleaning stage for selective catalytic oxidation of the carbon monoxide or upstream of a fuel cell in the fuel gas stream.

11. The device according to claim 9, wherein the buffer component contains CuY or CuZSM-5.

12. The device according to claim 9, wherein:

the gaseous constituent which is to be buffered is stream; and the buffer component is arranged immediate upstream or downstream of a reforming reactor or a shift stage in the fuel gas stream.

13. The device according to claim 9, wherein the buffer component contains activated carbon, aluminum oxide/alumina, silica gel or a zeolite material.

14. The device according to claim 9, wherein:

the gaseous constituent to be buffered is hydrogen; and the buffer component is arranged downstream of a fuel cell.

15. The device according to claim 14, wherein the buffer component contains an alloy of the composition AB, AB2, A2B or AB5, where A is one of the elements magnesium, calcium, titanium, zirconium, vanadium and lanthanum, and B is one of the elements manganese, iron, cobalt, nickle and copper.

16. The device according to claim 9, wherein the buffer component has a plurality of partial components each of which is adapted to store an individual gaseous constituent that is contained in said gas stream.

* * * * *